(12) United States Patent
Fujieda et al.

(10) Patent No.: US 7,089,908 B2
(45) Date of Patent: Aug. 15, 2006

(54) CONTROL DEVICE AND CONTROL METHOD FOR DIRECT INJECTION ENGINE

(75) Inventors: Mamoru Fujieda, Ibaraki (JP); Junichi Yamaguchi, Tokyo (JP); Hiroshi Fujii, Tokyo (JP); Minoru Oosuga, Tokyo (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 10/857,907

(22) Filed: Jun. 2, 2004

(65) Prior Publication Data

US 2004/0244766 A1    Dec. 9, 2004

(30) Foreign Application Priority Data

Jun. 3, 2003    (JP) .............................. 2003-158289

(51) Int. Cl.
F02B 3/00    (2006.01)

(52) U.S. Cl. ....................................... 123/299; 123/305

(58) Field of Classification Search ................ 123/299, 123/305, 568.14, 27 R, 295, 308
See application file for complete search history.

(56) References Cited

U.S. PATENT DOCUMENTS 6,082,342 A * 7/2000 Duret et al. ........... 123/568.14
6,305,364 B1 * 10/2001 Ma ....................... 123/568.14
6,497,213 B1 * 12/2002 Yoshizawa et al. ......... 123/299
6,530,361 B1 * 3/2003 Shiraishi et al. ............ 123/435
6,543,411 B1 * 4/2003 Raab et al. .................. 123/305
6,564,758 B1 * 5/2003 Enderle et al. ............... 123/64
6,609,493 B1 * 8/2003 Yamaguchi et al. ......... 123/299
6,612,294 B1 * 9/2003 Hiraya et al. ........... 123/568.14
6,619,255 B1 * 9/2003 Urushihara et al. ......... 123/295
6,640,773 B1 * 11/2003 Ancimer et al. ............. 123/299
6,675,579 B1 * 1/2004 Yang ........................... 60/599
6,708,680 B1 * 3/2004 Lavy et al. .................. 123/586
6,718,957 B1 * 4/2004 Kakuho et al. ......... 123/568.14
2003/0070637 A1   4/2003 Yoshihiro

FOREIGN PATENT DOCUMENTS

| EP | 1 052 391 A | 11/2000 |
|---|---|---|
| EP | 1 389 679 A | 2/2004 |
| JP | 2002-256924 | 11/2002 |
| WO | WO 02/086297 A1 * | 11/2002 |

* cited by examiner

Primary Examiner—Stephen K. Cronin
Assistant Examiner—Arnold Castro
(74) Attorney, Agent, or Firm—Crowell & Moring LLP

(57) ABSTRACT

A combustion control device and a method for a direct injection engine are disclosed wherein, when the engine is operating in the partial load range, the valve opening/closing mode of an intake valve and/or an exhaust valve is controlled so that exhaust gases remain in a combustion chamber; and control is performed such that fuel is injected from a fuel injection valve into residual exhaust gases at least once during the time period from the latter half of an exhaust stroke to the first half of an intake stroke in one combustion cycle, and that an air-fuel mixture is ignited in the latter half of a compression stroke thereafter.

16 Claims, 10 Drawing Sheets

CONTROL DEVICE AND CONTROL METHOD FOR DIRECT INJECTION ENGINE

BACKGROUND OF THE INVENTION

1. Field of the Invention

The present invention relates to a combustion control device and a combustion control method for a spark ignition direct injection engine. More particularly, the present invention pertains to a combustion control device and a combustion control method that promote the vaporization and radicalization of fuel injected from a fuel injection valve into a cylinder taking advantage of the heat of exhaust gases (burned gases), thereby improving the combustibility, fuel economy, exhaust gas purification performance, and the like.

2. Description of the Related Art

The spark ignition direct injection engine injects fuel directly into each cylinder. Accordingly, the spark ignition direct injection engine injects the fuel in the latter half of a compression stroke, and during a stratified charge combustion, in which an air-fuel mixture is burned in the cylinder with the air-fuel ratio distribution of the mixture therein made uneven, it can vaporize the fuel by compressed air in the cylinder. Simultaneously, the high pressure within the cylinder decreases the penetration force of a mist, thereby reducing the adhesion of the fuel to the wall surface of the cylinder.

In the homogeneous combustion (stoichiometric combustion), in which fuel is burned in the vicinity of the theoretical air-fuel ratio, the fuel is injected in the first half of an intake stroke in order to buy the mixture time for making uniform the air-fuel mixture in the cylinder. However, during the intake stroke, since the pressure within the cylinder becomes equal to the pressure within an intake pipe, the cylinder temperature falls especially during cold start, so that the amount of heat required to vaporize the fuel cannot be obtained. As a result, the air-fuel mixture is prone to become non-uniform due to a lack of vaporization, thereby causing the deterioration of exhaust gas purification performance and fuel economy.

Such being the situation, when attempting to produce a homogeneous air-fuel mixture, it is necessary to raise the temperature within the cylinder and secure the amount of heat required for fuel evaporation (vaporization). As one solution to this issue, JP-A-2002-256924 discloses a method by which the exhaust valve is early closed in course of the exhaust stroke; fuel is injected into burned gases having residual oxygen; the fuel is ignited in the vicinity of the end of the exhaust stroke; and the intake air is heated by the heat due to the ignition, thereby promoting the vaporization of the fuel, and enhancing the pressure within the cylinder during the compression stroke (see pages 1 to 5, and FIGS. 1 to 6 of the above patent document).

SUMMARY OF THE INVENTION

In the aforesaid method set forth in the above patent document and the like, fuel is injected into exhaust gases, and immediately thereafter (i.e., at a final stage of the exhaust stroke), the fuel is ignited and burned with residual oxygen. Therefore, the main combustion (combustion in the latter half of the compression stroke) must be in so-called "lean burn" conditions, so that a three-way catalyst cannot be used. This raises a problem in that it is difficult to remove NOx, which occurs particularly in the combustion in the exhaust stroke. Also, since the fuel injected into exhaust gases is burned in the exhaust stroke, merely fuel that is commensurate in amount with residual oxygen can be injected. This imposes limitations to the amount of fuel that can be injected in the exhaust stroke.

Accordingly, it is an object of the present invention to provide a combustion control device and combustion control method for a direct injection engine that are capable of sufficiently vaporizing fuel even when the engine is cold immediately after startup, burning an air-fuel mixture under stoichiometric conditions, improving the combustion stability and fuel economy, and reducing hydrocarbons (HC) and NOx.

In order to achieve the above-describe object, the present invention provides a combustion control device for a direct injection engine that includes a valve control device capable of varying the valve opening/closing mode of an intake valve and/or an exhaust valve; a valve opening/closing control section for controlling the valve opening/closing mode by the valve control device; a fuel injection valve for injecting fuel into a cylinder; and a fuel injection control section for controlling the fuel injection mode by the fuel injection valve.

In this combustion control device, the valve opening/closing control section controls the valve opening/closing mode of the intake valve and/or the exhaust valve so that exhaust gases remain in a combustion chamber, and the fuel injection control section performs control for injecting fuel from the fuel injection valve into the residual exhaust gases at least once during the time period from the latter half of an exhaust stroke to the first half of an intake stroke in one combustion cycle.

In the present combustion control device, it is preferable that the ignition of an air-fuel mixture be performed in the latter half of a compression stroke, and that the valve opening/closing control section and the fuel injection control section perform the above-described respective control operations so that the combustion of an air-fuel mixture becomes stoichiometric combustion. Also, it is preferable that the valve opening/closing control section and the fuel injection control section perform the above-described respective control operations when an engine is operating in a partial load range.

Furthermore, since the air-fuel mixture is burned in a stoichiometric state, the present combustion control device preferably includes a three-way catalyst as a catalyst for purifying exhaust gases.

In the present combustion control device, it is preferable that, when the operation state of the engine satisfies a specified condition, the fuel injection control section perform the fuel injection by the fuel injection valve during one combustion cycle by dividing the fuel injection into a plurality of times of fuel injections. Moreover, in the present combustion control device, it is preferable that the fuel injection control section calculate the fuel injection quantity based on operating conditions of the engine, and that, when the calculated fuel injection quantity is no less than two times the minimum controllable quantity of the fuel injection valve, the fuel injection control section perform the fuel injection by dividing it into a plurality of times of fuel injections.

When performing fuel injection by dividing it into a plurality of times of fuel injections like this, it is preferable that a last time of fuel injection be performed in the compression stroke, and that the fuel injection quantity at each time of the fuel injections be set to be equal. Alternatively, the fuel injection quantity at the last time may be fixed at a constant value, and the fuel injection quantities at other times may be varied.

In the present combustion control device, it is preferable that the valve opening/closing control section and the fuel injection control section close the exhaust valve before opening the intake valve, in order to cause exhaust gases to remain in the combustion chamber, and that the valve opening/closing control section and the fuel injection control section perform at least one time of fuel injection before the intake valve opens.

In this case, the valve opening/closing control section preferably closes the exhaust valve before the top dead center in the exhaust stroke. Furthermore, the valve opening/closing control section preferably opens the intake valve at the crank angle position symmetrical with the crank angle position corresponding to the closing timing of the exhaust valve with respect to the top dead center in the exhaust stroke.

In the present combustion control device, it is preferable that the valve control device can vary the opening timing and the valve lift amount of the intake valve, and/or the closing timing and the valve lift amount of the exhaust valve. Alternatively, the valve control device may simultaneously shift the opening timing and the closing timing of the intake valve and/or the exhaust valve. Still alternatively, the valve control device may fix the opening timing and the closing timing of the exhaust valve, and may simultaneously shift the opening timing and the closing time of the intake valve. Further alternatively, the valve control device simultaneously shifts the opening timing and the closing timing of the exhaust valve, and may fix the opening timing and the closing timing of the intake valve.

According to the present invention, there is provided a combustion control method for a direct injection engine including, when the engine is operating in a specified load range, the following steps: a step of controlling the valve opening/closing mode of an intake valve and/or an exhaust valve so that exhaust gases remain in a combustion chamber; and a step of performing control such that fuel is injected from a fuel injection valve into the residual exhaust gases at least once during the time period from the latter half of an exhaust stroke to the first half of an intake stroke in one combustion cycle, and that an air-fuel mixture is ignited in the latter half of a compression stroke thereafter.

In the present combustion control method, it is preferable that the above-described control with respect to the valve opening/closing mode and the fuel injection mode be performed so that the air-fuel mixture during combustion comes into stoichiometric conditions.

Also, in the present combustion control method, when the operation state of the engine satisfies a specified condition, it is preferable that the fuel injection be performed by dividing it into a plurality of times of fuel injections during one combustion cycle, that, out of the plurality of times of fuel injections, the fuel injection at a first time be performed during the time period from the latter half of the exhaust stroke to the first half of the intake stroke, and that the fuel injection at the last time be performed in the compression stroke.

In this case, it is preferable that the fuel injection quantity at the last time be fixed at a constant value, and that the fuel injection quantities at other times be varied.

Furthermore, in the present combustion control method, it is preferable that the exhaust valve be closed before the intake valve is opened, in order to cause exhaust gases to remain in the combustion chamber, and that at least one time of fuel injection be performed before the intake valve opens.

In the preferable aspects in the combustion control device and method for a direct injection engine according to the present invention with the above-described features, when the engine is operating in the partial load range, the exhaust valve is early closed as well as the intake valve is late opened, whereby exhaust gases (burned gases) are caused to remain in the combustion chamber (internal EGR (exhaust gas recirculation)), and the fuel is injected from the fuel injection valve into this residual exhaust gases. Therefore, the fuel injected from the fuel injection valve is heated by the heat of exhaust gases and vaporized. Furthermore, in the preferable aspects, the fuel is subject to compression heating by a piston, and thereby the vaporization and radicalization of the fuel is promoted. As a result, even when the engine is cold immediately after startup, the fuel can be sufficiently vaporized and radicalized. This makes it possible to increase the combustion stability, enhance the fuel economy, reduce HC, and improve the starting performance of the engine.

Also, the radicalization of a part of fuel allows surrounding fuel to self-ignite during combustion, so that the combustion time is reduced, fuel economy is enhanced (i.e., the degree of constant volume of air-fuel mixture is improved), and the ignition timing can be retarded, resulting in reduced NOx.

Furthermore, performing fuel injection by dividing it into a plurality of times of injections reduces the penetration force of a fuel mist, and decreases the adhesion of fuel to the wall surface of the cylinder. As a consequence, HC is reduced, and the stratification of air-fuel mixture can be achieved, thereby improving the ignitability. Therefore, even though a large quantity of exhaust gases remain (internal EGR), stable combustion can be secured, and simultaneously, the internal EGR makes it possible to decrease NOx and reduce pumping loss, thereby contributing to the improvement in fuel economy.

Moreover, as described above, since not only NOx can be reduced, but also the air-fuel mixture can be combusted under stoichiometric conditions (i.e., substantially in the theoretical air-fuel ratio), a three-way catalyst having high exhaust gas purification performance can be used as an exhaust gas purification system. Consequently, as compared with the case where an NOx catalyst is used, the exhaust gas purification system can be reduced in volume and cost.

DESCRIPTION OF THE PREFERRED EMBODIMENTS

Hereinafter, embodiments according to the present invention will be described with reference to the accompanying drawings.

Figure 1:
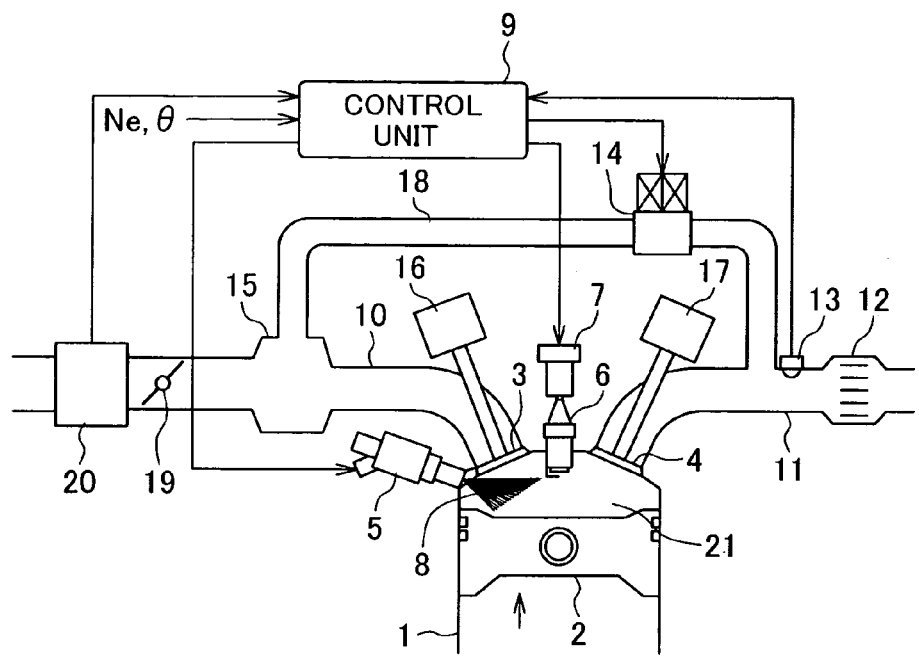
FIG. 1 is a basic block diagram of a control device for a direct injection engine according to an embodiment of the present invention.

FIG. 1 is a basic block diagram of a spark ignition direct injection engine into which a combustion control device according to an embodiment of the present invention is incorporated.

Referring to FIG. 1, an engine 1 includes a piston 2, an intake valve 3, and an exhaust valve 4. Intake air enters from an air flow meter (AFM) 20 into a throttle valve 19, and is supplied from a collector 15, which forms a branch portion, to the engine 1 through an intake pipe 10 and the intake valve 3. Fuel is injected from a fuel injection valve 5 to a combustion chamber 21 of the engine (cylinder) 1, and ignited by an ignition coil 7 and an ignition plug 6. Exhaust gases from the engine 1 is discharged from the exhaust valve 4 through an exhaust pipe 11 to the outside after being purified by a three-way catalyst 12.

An engine control unit (ECU) 9 inputs signals, such as a crank angle signal of the engine 1, a rotational speed (number of revolutions) Ne of the engine, an air flow rate signal from AFM 20, and a signal from an oxygen sensor 13 for detecting the oxygen concentration of exhaust gases. On the other hand, the engine control unit 9 outputs a fuel injection signal to the fuel injection valve 5, an ignition signal to the ignition plug 6, an opening/closing control signal to an EGR valve for opening/closing an EGR passage, and also valve control signals to valve control devices 16 and 17 attached to the intake valve 3 and the exhaust valve 4.

Each of the valve control devices 16 and 17 may be one of various types. For example, each of the valve control devices 16 and 17 may be (A) a valve control device capable of varying the valve opening timing and the valve lift amount of the intake valve 3, and the valve closing timing and the valve lift amount of the exhaust valve 4, (B) a valve control device capable of simultaneously shifting the opening timing and the closing timing of the intake valve 3 and/or the exhaust valve 4, or (C) a valve control device capable of varying the opening timing and the valve lift amount of the intake valve 3, and the opening timing and the closing timing of the exhaust valve 4.

Figure 3:
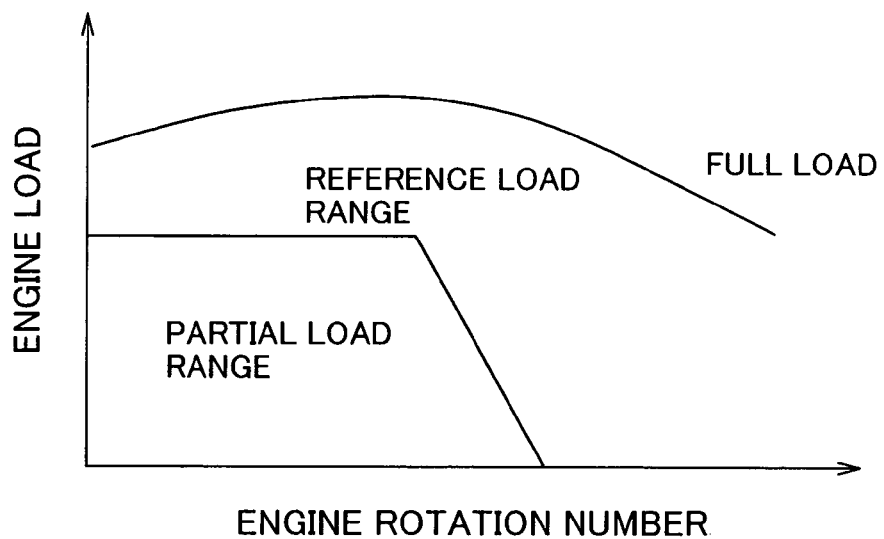
FIG. 3 is a diagram used for determining whether the engine is operating in the partial load range or the reference load range.

With these arrangements, the control unit 9 determines whether the engine 1 is operating in the partial load range (low-load and low-rotation number range including idling) or in the reference load range, which are shown in FIG. 3, based on the engine load such as the intake air flow rate, and the engine rotation number. In accordance with a load range, the control unit 9 varies the valve opening/closing mode (opening and closing timings, and lift amount) of each of the intake valve 3 and the exhaust valve 4, and the fuel injection mode (fuel injection timing, fuel injection quantity, and number of injection times) provided by the fuel injection valve 5. Under the partial load condition, the control unit 9 controls the valve opening/closing mode and the fuel injection mode so that the air-fuel ratio of an air-fuel mixture during combustion becomes substantially the theoretical air-fuel ratio throughout the cylinder, namely, so that the combustion of the air-fuel mixture becomes stoichiometric combustion. Burning the air-fuel mixture under stoichiometric conditions makes it possible to early inject fuel and provide sufficient residence time to obtain vaporization and mixing of the fuel and air. In contrast, the stratified lean burn needs to make relatively short the time period from injection to ignition in order to prevent diffusion.

Figure 2:
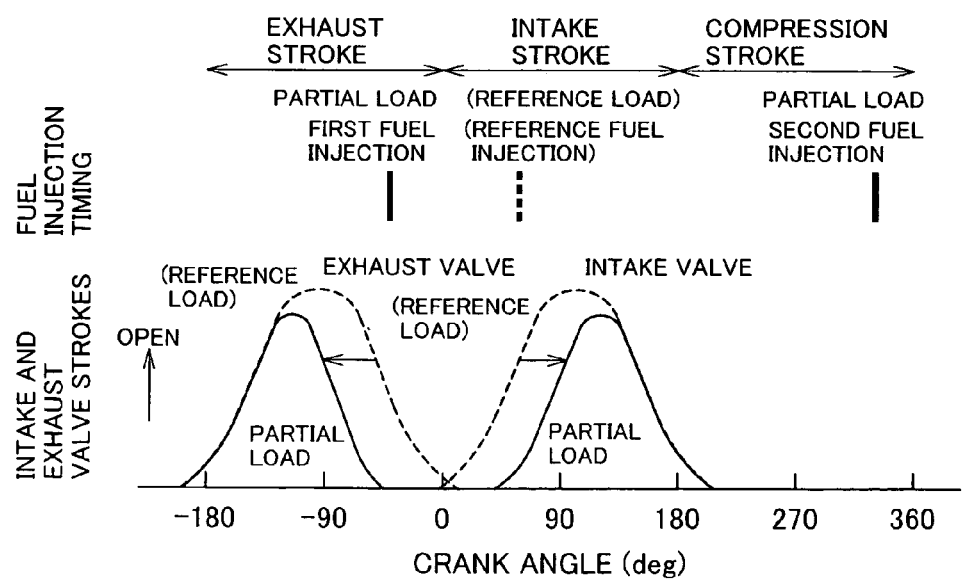
FIG. 2 is a diagram showing valve opening/closing modes and a fuel injection mode according to a first embodiment, wherein valve control devices are used by which the opening timing and the valve lift amount of an intake valve, and the closing timing and the valve lift amount of an exhaust valve are made variable.

FIG. 2 shows a valve opening/closing mode (opening and closing timings and lift amount) of each of the intake valve 3 and the exhaust valve 4, and a fuel injection mode (number of injection times and fuel injection timing) provided by the fuel injection valve 5, according to a first embodiment, wherein the engine is operating in the reference load range and the partial load range, and wherein, as described in the aforesaid item (A), as the valve control devices 16 and 17, ones by which the valve opening timing and the valve lift amount of the intake valve 3, and the valve closing timing and the valve lift amount of the exhaust valve 4 are made variable, are employed.

In FIG. 2, the lateral axis indicates the crank angle that is 0 degree at the top dead center position in the exhaust stroke, and the longitudinal axis indicates the stroke (lift amount) of each of the intake valve 3 and the exhaust valve 4. Here, the valve opening/closing mode and the fuel injection timing under the condition that the engine is operating in the reference load range is indicated by a broken line, while those under the condition that the engine is operating in the partial load range is indicated by a solid line (the same shall apply in FIGS. 6 and 7, and FIGS. 9 to 17 illustrated later).

In this embodiment, under either of the reference condition and the partial load condition, the opening timing of the exhaust valve 4 is set at a final stage of an expansion stroke (i.e., at a crank angle position of less than −180 degrees), and the closing timing of the intake valve 3 is set at an initial stage of the compression stroke (i.e., at a crank angle position of more than +180 degrees). Also, both of the closing timing of the exhaust valve 4 and the opening timing of the intake valve 3 under the reference load condition are set at substantially the top dead center of the exhaust stroke (i.e., at approximately 0 degree), and the lift amount of each of the valves at this time is made large.

In contrast, under the partial load condition, the lift amount of each of the intake valves 3 and the exhaust valve 4 is made smaller than under the reference load condition. The closing timing of the exhaust valve 4 is made earlier than under the reference load condition and is set in the latter half of the exhaust stroke (i.e., early closing), while the opening timing of the intake valve 3 is made later than under the reference load condition and is set in the first half of the intake stroke (i.e., late opening). More specifically, the closing timing of the exhaust valve 4 is set at approximately −45 degrees, while the opening timing of the intake valve 3 is set at the crank angle position symmetrical with that of the aforesaid closing timing of the exhaust valve 4 with respect to the top dead center in the exhaust stroke (0 degree), i.e., approximately at +45 degrees.

Regarding the fuel injection timing, under the reference load condition, the fuel injection timing is set in the first half of the intake stroke. On the other hand, under the partial load condition, the fuel injection is divided into a one-time injection and two-time injections in accordance with the fuel injection quantity calculated based on operating conditions of the engine. Specifically, if the calculated fuel injection quantity is less than two times the minimum controllable quantity of the fuel injection 5, the injection is performed once. The injection timing then is set in the first half of the intake stroke as in the above-described case under the reference load condition. On the other hand, if the calculated fuel injection quantity is no less than two times the minimum controllable quantity of the fuel injection 5, the injection is performed twice. That is, the fuel injection then is performed by dividing the fuel injection (fuel injection quantity) into two-times. Here, the first injection timing is set in the latter half of the exhaust stroke after the exhaust valve 4 has been closed. The second injection timing is set in the latter half of the compression stroke immediately before the ignition by the ignition plug 6 is performed. In this case, the fuel injection quantity may be equalized between two injections. Alternatively, the second-time fuel injection quantity (second fuel injection quantity) may be fixed at a constant value, and the first-time fuel injection quantity (first fuel injection quantity) may be increased or decreased in accordance with operating conditions. Meanwhile, the main purpose of the second fuel injection is to achieve stratification for facilitating the ignition of air-fuel mixture, but the changing of injection quantity then involves the changes of ignition timing and the like.

Next, operations and actions of various portions of the engine 1 under the condition that the valve opening/closing mode of each of the intake valve 3 and the exhaust valve 4, and the fuel injection mode provided by the fuel injection valve 5 are set as described above, will be described regarding an first embodiment wherein the engine 1 is operating in the partial load range and wherein fuel injections are performed twice.

In this first embodiment, the exhaust valve 4 closes in the latter half of the exhaust stroke before the exhaust valve 4 reached the top dead center in the exhaust stroke, i.e., at approximately −45 degrees, so that exhaust gases (burned gases) remain in the combustion chamber 21 (internal EGR). The first-time fuel injection (first fuel injection) is performed from the fuel injection valve 5 into the residual exhaust gases, thereby forming a mist 8 in the combustion chamber 21. At this time, the residual exhaust gases have a high temperature, and is compressed in the combustion chamber 21 because the intake valve 3 is still kept closed although the piston 2 is moving up. As a result, the fuel injected from the fuel injection valve 5 is vaporized by the heat of the exhaust gases, and is subjected to further compression heating by the piston 2 until the piston 2 reaches the top dead center in the exhaust stroke. This promotes the vaporization and radicalization of the fuel.

When passing the top dead center in the exhaust stroke, the piston 2 begins to move down, and the intake stroke starts. However, the intake valve 3 maintains a closed state up to the crank angle position symmetrical with the crank angle position corresponding to the closing timing of the exhaust valve 4 where the exhaust valve closes, with respect to the top dead center in the exhaust stroke. In this manner, by symmetrizing the crank angle position corresponding to the closing timing of the exhaust valve 4 and the crank angle position corresponding to the opening timing of the intake valve 3 with respect to the top dead center in the exhaust stroke, it is possible to recoup negative work required for the compression in the latter half of the exhaust stroke with expansion work (positive work) in the first half of the intake stroke. This allows the efficiency of the engine 1 to be retained.

Thereafter, the intake valve 3 opens and new air is taken into the combustion chamber 21, but the once-vaporized fuel maintains its vaporized state substantially as it is. During the time period from the intake stroke to an initial stage of the compression stroke, in which the intake valve 3 is opened and thereafter closed again, a required quantity of new air is taken in, and the air-fuel mixture between the residual exhaust gases, which have been mixed with the fuel vaporized in the compression stroke, and the new air, is compressed. Then, in the latter half of the compression stroke, fuel is injected again (second fuel injection). As a result of this second fuel injection, an air-fuel mixture that is a little richer than that in the overall cylinder is formed in the vicinity of the ignition plug 6 (regarding the overall cylinder, the air-fuel mixture is in stoichiometric conditions), and is ignited by the ignition plug 6 and burned. The burned gases (exhaust gases) are discharged into the exhaust pipe 11 during the time period from the latter half of the expansion stroke to the latter half of the exhaust stoke, in which the exhaust valve 4 is opened, and after harmful components (HC, NOx, etc.) are removed by the three-way catalyst 12, the burned gases are discharged to the outside, thereby completing one combustion cycle.

Figure 4:
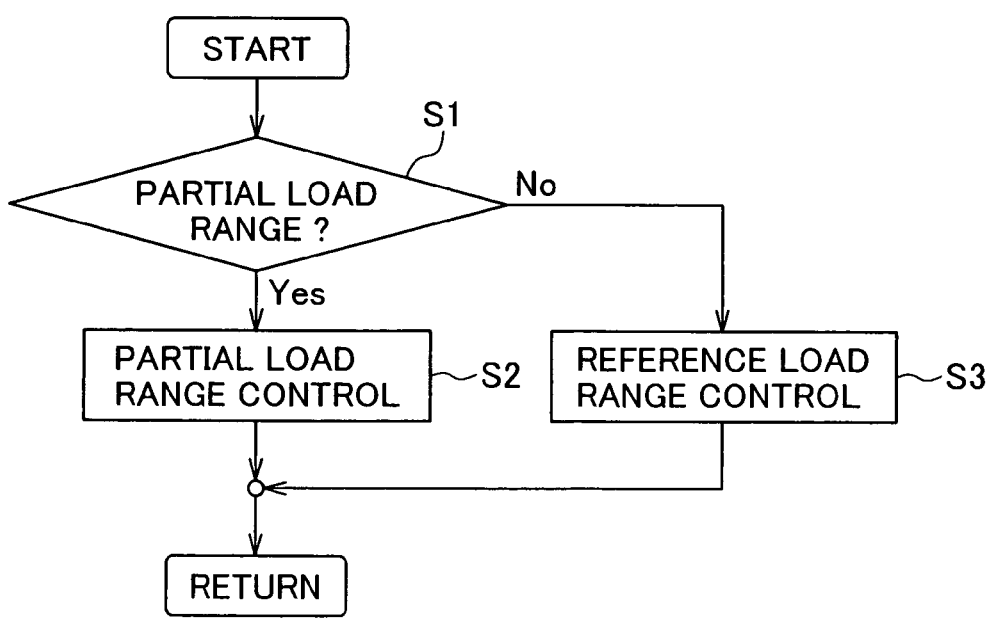
FIG. 4 is a flowchart showing an example of load range determining routine executed by a control unit.
Figure 5:
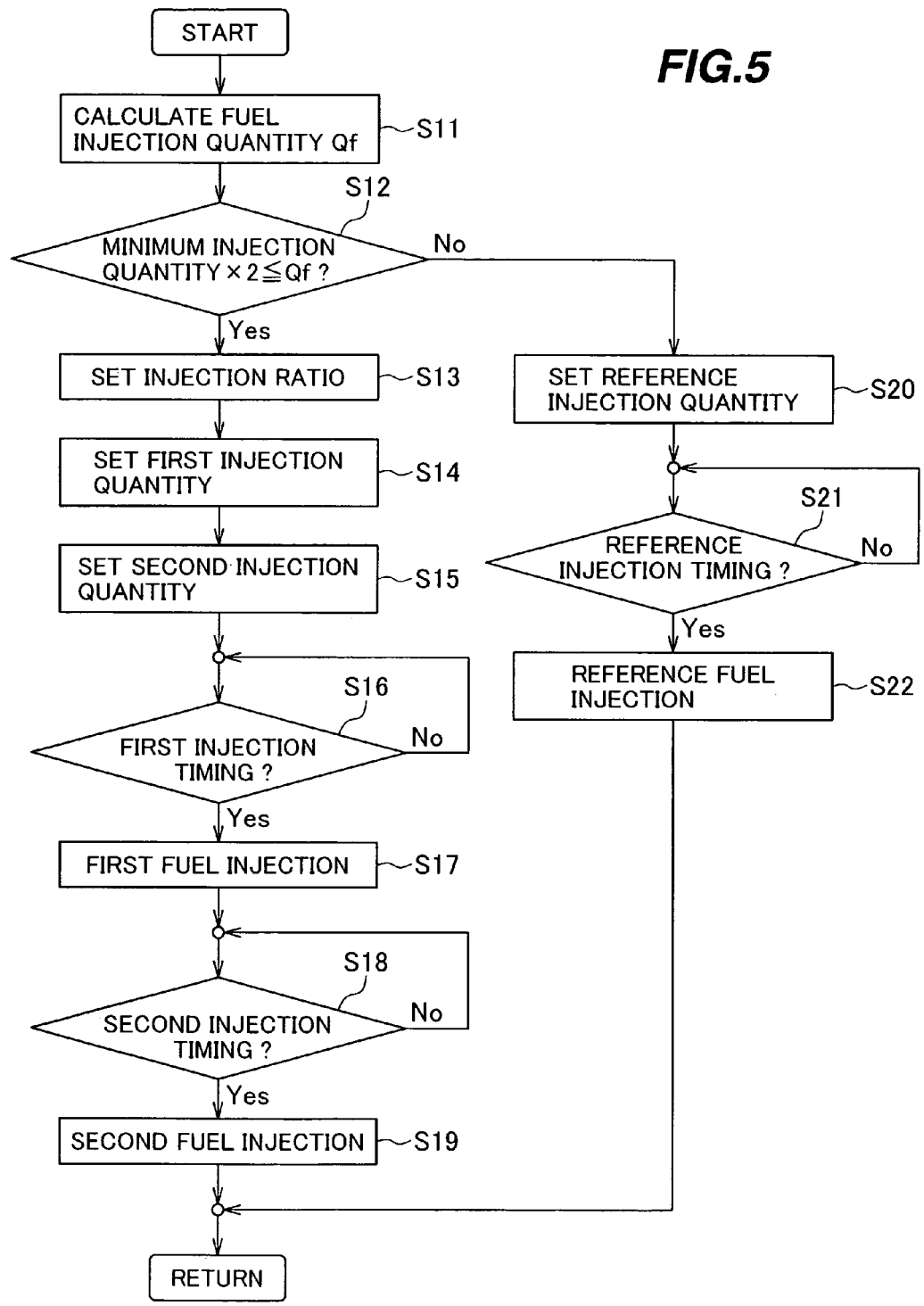
FIG. 5 is a flowchart showing an example of fuel injection control routine executed by the control unit.

The control as described above is performed by the control unit 9. FIGS. 4 and 5 shows examples of programs executed by the control unit 9 when performing the control.

FIG. 4 shows an operating load range determination routine. In this routine, firstly in step S1, the operating load range is determined based on the engine rotation number and the engine load shown in FIG. 3. If the engine is operating in the partial load range, the proceeding advances to step S2, where the valve opening/closing mode and the fuel injection mode are assumed as corresponding to the partial load range. On the other hand, if the engine is operating in the reference load range, the proceeding advances to step S3, where the valve opening/closing mode and the fuel injection mode are assumed as corresponding to the reference load range. When the proceeding advances to step S2, the control unit 9 executes the fuel injection control routine shown in FIG. 5. On the other hand, when the proceeding advances to step S3, the control unit 9 executes the ordinary fuel injection control.

In the control routine under the partial load condition shown in FIG. 5, in step S11, the fuel injection quantity Qf is calculated based on operating conditions of the engine 1 (intake air flow rate, engine rotation number, cooling water temperature, intake air temperature, etc.). Next, in step S12, it is determined whether the calculated fuel injection quantity Qf is no less than two times the minimum controllable quantity of the fuel injection valve 5. If the determination in step S12 is "Yes", an injection ratio (the ratio between the first fuel injection quantity and the second fuel injection quantity) is set in step S13 in order to perform two-time injections. In steps S14 and S15, respectively, the first and second fuel injection quantities are set, and then the proceeding advances to step S16. In step S16, the determination as to the first injection timing is performed, and when the first injection timing (here, in the latter half of the exhaust stroke) is reached, the first injection is performed in step S17. Next, the proceeding advances to step S18, where the determination as to the second injection timing is performed, and when the second injection timing (here, in the latter half of the compression stroke) is reached, the second injection is performed in step S19. Thereafter, the proceeding returns to the operating load determination routine.

On the other hand, if the determination in step S12 is "No", the reference injection quantity is set in step S20. Then, in step S21, the determination as to the reference injection timing is performed, and when the reference injection timing (here, in the first half of the intake stroke) is reached, the reference injection is performed in step S22. Thereafter, the proceeding returns to the operating load determination routine.

Here, regarding the injection ratio in step S13, the first and second fuel injection quantities may be equalized. Alternatively, this ratio may be changed in accordance with operating conditions of the engine 1. This advantageously produces an effect in securing the combustibility and improving the thermal efficiency. On the other hand, if the calculated fuel injection quantity Qf is less than two times the minimum controllable quantity of the fuel injection valve 5, only one-time injection is performed at the reference injection timing (the injection in the first half of the intake stroke is prone to provide a most homogeneous air-fuel mixture). Alternatively, the fuel injection may be performed only at the first injection timing (in the latter stroke of the exhaust stroke) under the partial load condition. Conversely, the injection may also be performed only at the second injection timing.

As described above, in this embodiment, when the engine 1 is operating in the partial load range, the exhaust valve 4 is early closed and the intake valve 3 is late opened, whereby exhaust gases (burned gases) is caused to remain in the combustion chamber 21 (internal EGR), and fuel is injected from the fuel injection valve 5 into the residual exhaust gases. Therefore, the fuel injected from the fuel injection valve 5 is heated by the heat of exhaust gases and vaporized, and the fuel is subjected to further compression heating by the piston 2, thereby promoting the vaporization and radicalization of the fuel. As a result, even when the engine is cold immediately after startup, the fuel can be sufficiently vaporized and radicalized. This makes it possible to increase the combustion stability, enhance the fuel economy, reduce HC, and improve the starting performance of the engine.

Also, the radicalization of a part of fuel allows the surrounding fuel to self-ignite during combustion, so that combustion time is reduced, fuel economy is enhanced (i.e., the degree of constant volume of air-fuel mixture is improved), and the ignition timing can be retarded, resulting in reduced NOx.

Furthermore, performing fuel injection by dividing it into a plurality of times of injections, reduces the penetration force of a fuel mist, and decreases the adhesion of fuel to the wall surface. As a consequence, HC is reduced, and the stratification of air-fuel mixture can be achieved, thereby improving the ignitability. Even though a large quantity of exhaust gases remain (internal EGR), stable combustion can be secured, and simultaneously, the internal EGR makes it possible to decrease NOx and reduce pumping loss, thereby contributing to the improvement in fuel economy.

As described above, since not only NOx can be reduced but also the air-fuel mixture can be combusted under stoichiometric conditions (i.e., substantially in the theoretical air-fuel ratio), a three-way catalyst having high exhaust gas purification performance can be used as an exhaust gas purification system. Consequently, as compared with the case where the NOx catalyst is used, the exhaust gas purification system can be reduced in volume and cost.

Hereinafter, embodiments in which the valve opening/closing mode and the fuel injection mode are different from the above-described first embodiment will be described.

Figure 6:
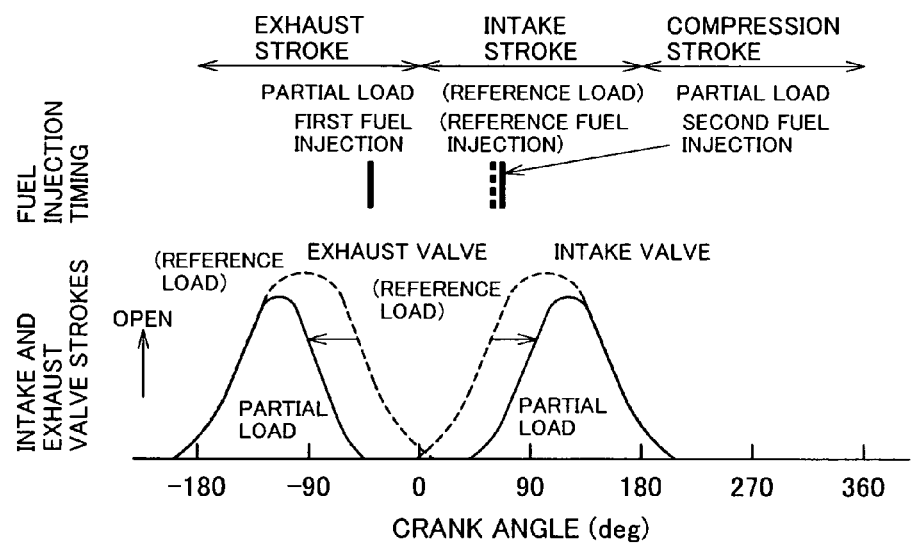
FIG. 6 is a diagram showing a second embodiment, which is different in the second fuel injection timing from the first embodiment shown in FIG. 2.

According to a second embodiment shown in FIG. 6, the second fuel injection is performed in the first half of the intake stroke as in the case under the reference load condition. In this second embodiment, the effect produced by early closing the exhaust valve 4 to cause exhaust gases to remain (internal EGR), is lower than that of the above-described first embodiment shown in FIG. 2. However, since the air-fuel mixture can be made more uniform, the combustion efficiency is increased and the thermal efficiency is improved.

Figure 7:
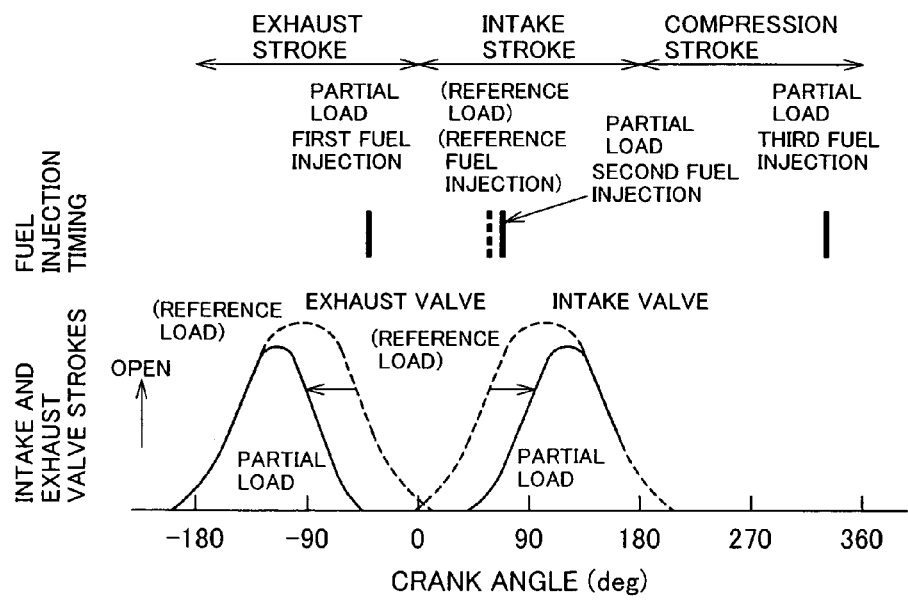
FIG. 7 is a diagram showing a third embodiment in which fuel injections are performed three times.

According to a third embodiment shown in FIG. 7, when the fuel injection quantity calculated based on operating conditions of the engine 1 is more than three times the minimum controllable quantity of the fuel injection valve 5, the fuel injection is performed by dividing it into three-time injections. When performing injections three times, the first-time, second-time, and third-time injections, respectively, are performed in the latter half of the exhaust stroke, the first half of the intake stroke, and the latter half of the compression stroke. With this arrangement, the effect produced by early closing the exhaust valve 4 to cause exhaust gases to remain (internal EGR) as described above, and the homogenization of air-fuel mixture can be simultaneously achieved. More specifically, in this case, not only the air-fuel mixture in the overall cylinder can be made more uniform, but also the air-fuel mixture in the vicinity of the ignition plug 6 can be made a little richer, and therefore, even though a large quantity of exhaust gases remain, the ignitability does not decrease, thereby improving the thermal efficiency. Regarding the third fuel injection quantity, it is advantageous in terms of the homogenization of air-fuel mixture, to fix the fuel injection quantity at a constant value even if load increases or decreases, and to increase or decrease the fuel injection quantities at other times in accordance with a load.

Figure 8:
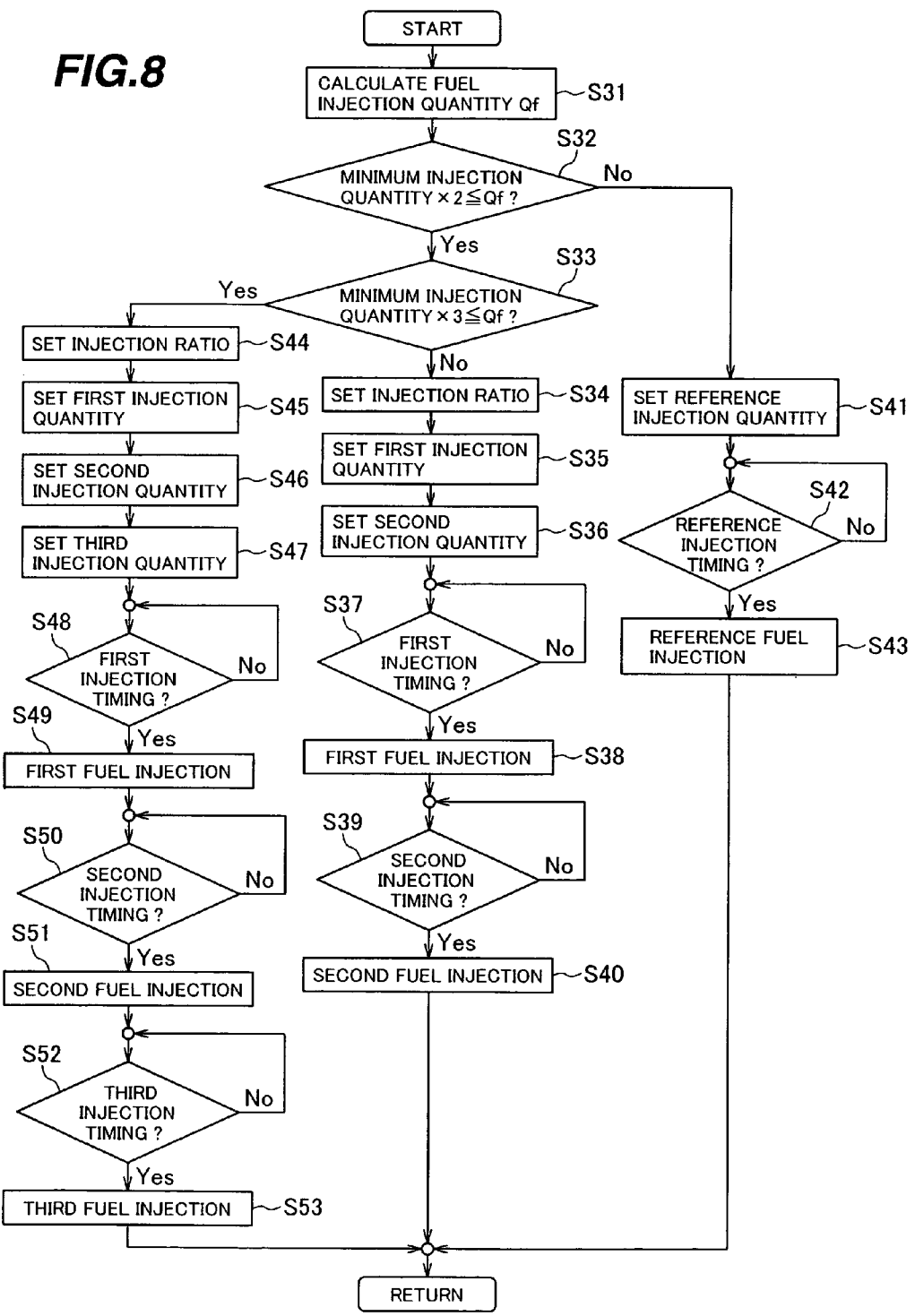
FIG. 8 is a flowchart showing a fuel injection control routine with respect to the third embodiment shown in FIG. 7.

FIG. 8 shows a fuel injection control routine with respect to a third embodiment illustrated in FIG. 7. In this routine, in step S31, the fuel injection quantity Qf is calculated, and in step S32, it is determined whether the calculated fuel injection quantity Qf is no less than two times the minimum controllable quantity of the fuel injection valve 5. If the determination in step S32 is "No", the proceeding advances to step S41, where the reference injection quantity is set. Then, the same proceeding as that in steps S20 to S22 in the above-described control routine shown in FIG. 5 is performed, and the proceeding returns to the fuel injection control routine. On the other hand, if the determination in step S32 is "Yes", it is determined in step S33 whether the fuel injection quantity Qf is no less than three times the minimum controllable quantity. If the determination in step S33 is "No", the calculated fuel injection quantity Qf is no less than two times and less than three times the minimum controllable quantity, and therefore, steps S34 to S40 are performed in order to perform two-time injections, in the same manner as steps S13 to S19 in the above-described control routine shown in FIG. 5. Thereafter, the proceeding returns to the fuel injection control routine. If the determination in step S33 is "Yes", the proceeding advances to step S44, where an injection ratio is set. Next, in steps S45, S46, and S47, respectively, the first, second, and third fuel injection quantities are set. In step S48, the determination as to the first injection timing is performed, and in step S49, the first fuel injection is performed. Next, in step S50, the determination as to the second injection timing is performed, and in step S51, the second fuel injection is performed. Then, in step S52, the determination as to the third injection timing is performed, and in step S53, the third fuel injection is performed. Thereafter, the proceeding returns to the fuel injection control routine.

Figure 9:
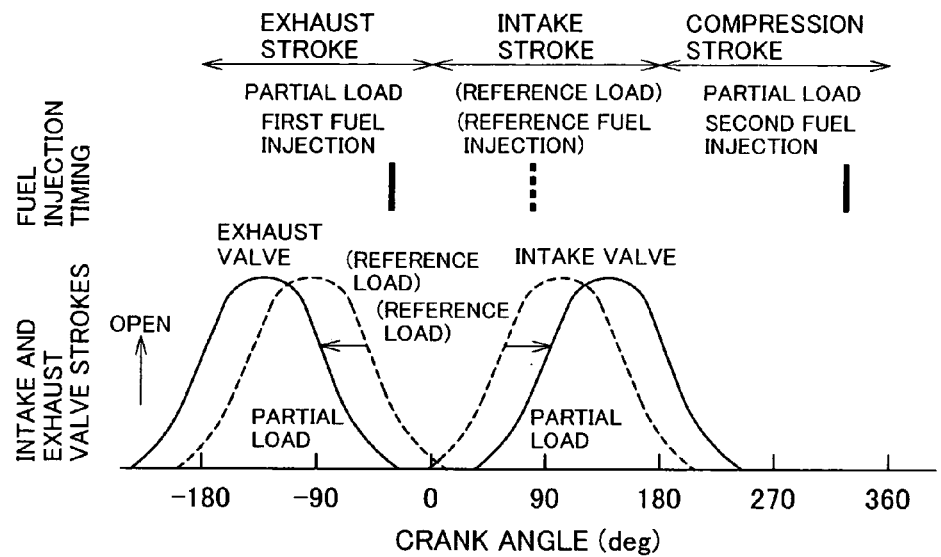
FIG. 9 is a diagram showing valve opening/closing modes and a fuel injection mode according to a fourth embodiment, wherein valve control devices are used by which the opening timing and the closing time of each of the intake valve and the exhaust valve are made simultaneously shiftable.

FIG. 9 shows a valve opening/closing mode (opening and closing timings) of each of the intake valve 3 and the exhaust valve 4, and a fuel injection mode (number of injection times and fuel injection timing) provided by the fuel injection valve 5, according to a fourth embodiment, wherein the engine is operating in the reference load range and the partial load range, and wherein, as described in the aforesaid item (B), as the valve control devices 16 and 17, the ones (valve timing control mechanisms (VTCs)) by which the opening timing and the closing time of each of the intake valve and the exhaust valve are made simultaneously shiftable, are employed. In this embodiment, under the partial load condition, the opening and closing timings of the exhaust valve 4 are moved toward the advance angle side (i.e., are advanced) by approximately 45 degrees relative to the case under the reference load condition, and simultaneously, the opening and closing timings of the intake valve 3 are moved toward the retard angle side (i.e., are retarded) by approximately 45 degrees as relative to the case under the reference load condition. In this way, advancing the closing timing of the exhaust valve allows a fuel injection to be performed in the exhaust stroke, thereby producing a combustion improving effect similar to the above-described embodiments. However, since the opening timing of the exhaust valve 4 is also advanced, the exhaust valve 4 opens in course of the expansion stroke, so that some reduction in efficiency due to the blowing down of exhaust gases occurs. Also, since the closing timing of the intake valve 3 drags on into the compression stroke, the blow back of intake air to the intake pipe 10 occurs, and the intake air quantity decreases. Advantageously, however, the valve control devices 16 and 17 in this embodiment has a construction simplified as compared with ones that can also change the above-described lift amount.

Figure 10:
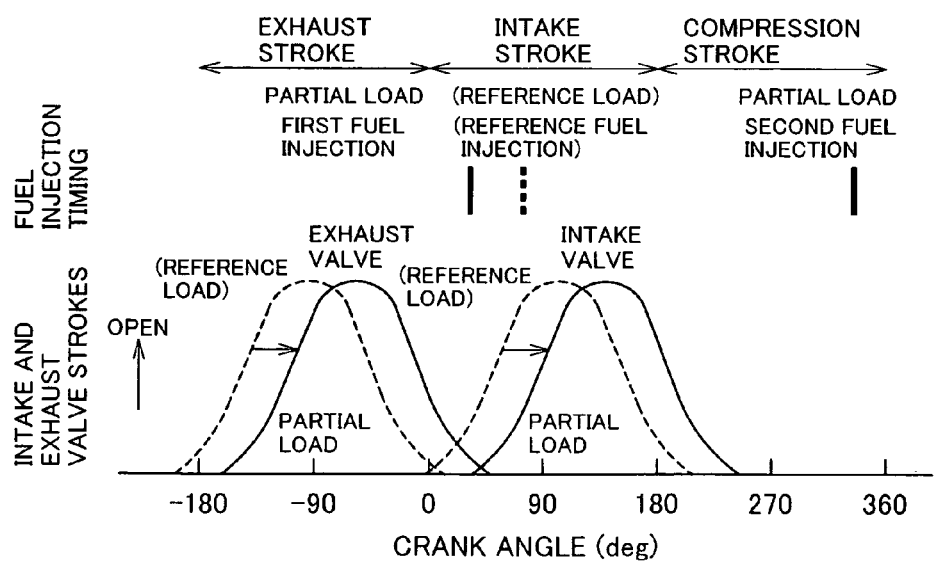
FIG. 10 is a diagram showing a fifth embodiment that is a modification of the fourth embodiment shown in FIG. 9.

A fifth embodiment shown in FIG. 10 is a modification of the fourth embodiment shown in FIG. 9. In this embodiment, the opening and closing timings of the exhaust valve under the partial load condition are retarded relative to the case under the reference load condition. The retardation of the closing timing of the exhaust valve 4 eliminates the blow down of exhaust gases in the expansion stroke, thereby improving the efficiency. In this embodiment, however, during the exhaust stroke, the exhaust valve 4 is opened and the compression of exhaust gases is impossible, so that the fuel injection in the exhaust stroke is not very effective. Accordingly, regarding the first fuel injection under the partial load condition, it is advantageous in terms of the vaporization of fuel, to perform the fuel injection during the time period from the onset of moving down of the piston 2 to the opening of the intake valve 3 because exhaust gases are not cooled by new air during that time.

Figure 11:
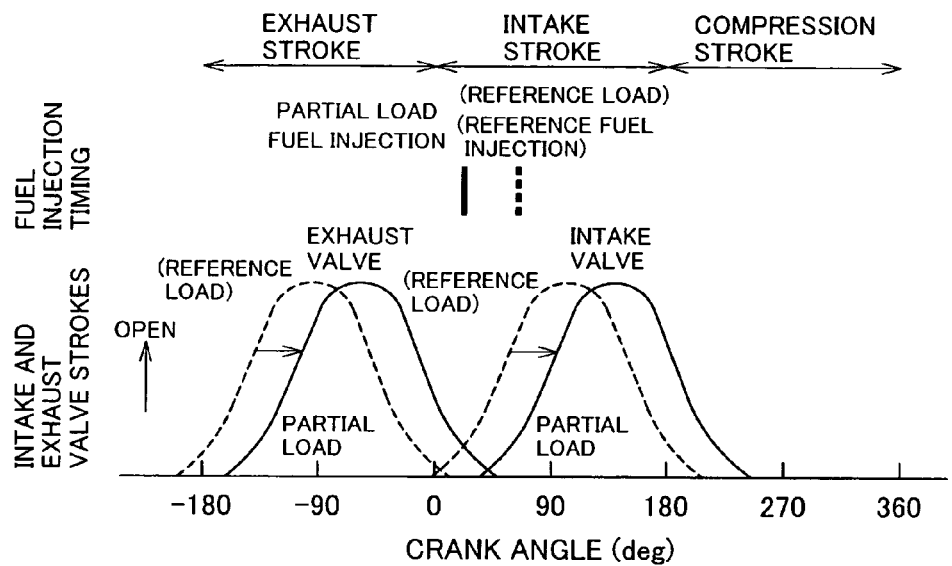
FIG. 11 is a diagram showing a sixth embodiment in which a fuel injection is performed only once.

FIG. 11 shows a sixth embodiment wherein the fuel injection under the partial load condition is performed only once. Regarding the case where fuel injection is performed only once, it is advantageous in terms of the homogenization of an air-fuel mixture, to perform an injection in the first half of the intake stroke because the vaporization by the heat of exhaust gases progresses.

Figure 12:
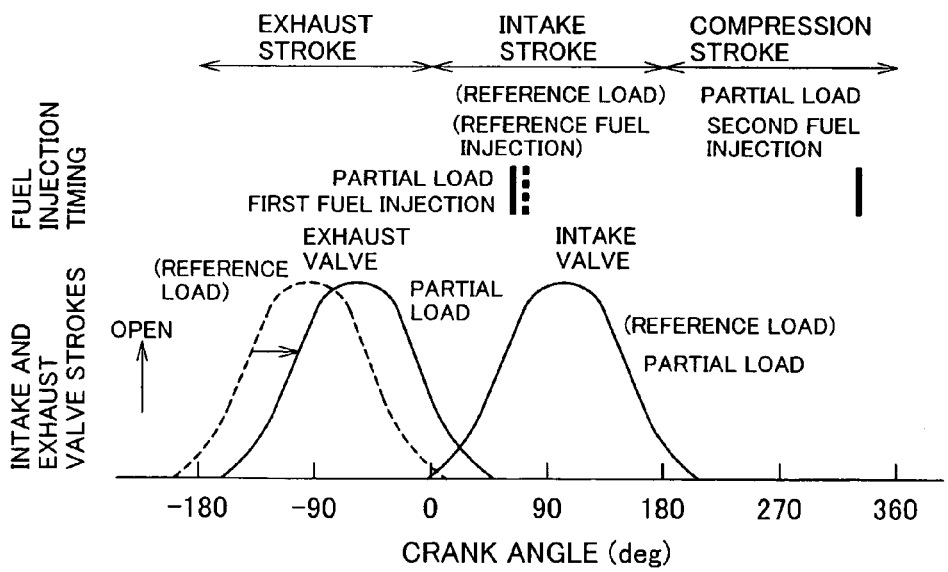
FIG. 12 is a diagram showing a seventh embodiment in which the opening and closing timings of the exhaust valve alone are made shiftable.

FIG. 12 shows a seventh embodiment wherein the opening and closing timings of the exhaust valve 4 alone are shifted by the valve control device 17 (consequently, the intake valve 3 requires no valve control device). In this embodiment, it is advantageous to retard the opening and closing timings of the exhaust valve 4 because a pressure loss of exhaust gases is not caused. The first fuel injection may be performed substantially at the same timing as the case under the reference load condition. Also, performing the second fuel injection allows a stable combustion to be secured with respect to a large quantity of internal EGR. However, even if the second fuel injection is omitted, the problem of securing a stable combustion can be coped with by reducing the internal EGR. On the other hand, when the opening and closing timings of the exhaust valve 4 are advanced, a compression loss of exhaust gases occurs, but combustion is improved by a vaporization promotion effect by the compression of exhaust gases and fuel, so that a sufficient effect can be expected. In this case, however, performing the second or third fuel injection in the intake stroke or the compression stroke would produce greater effect.

Figure 13:
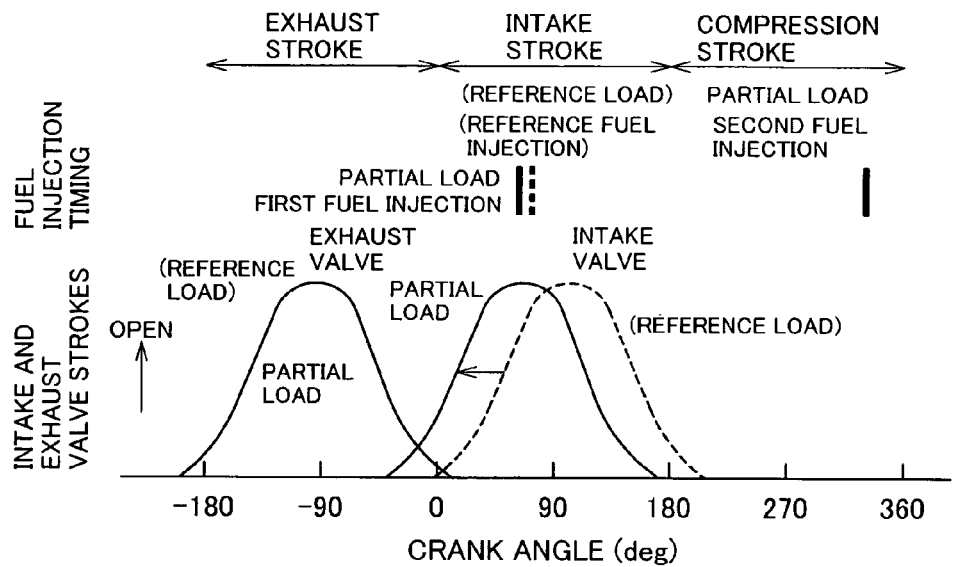
FIG. 13 is a diagram showing an eighth embodiment in which the opening and closing timings of the intake valve alone are made shiftable.

FIG. 13 shows an eighth embodiment wherein the opening and closing timings of the intake valve 13 alone are shifted by the valve control device 16 (consequently, the exhaust valve 4 requires no valve control device). In this case, it is advantageous to advance the opening and closing timings of the intake valve 3. The first fuel injection may be performed at substantially the same timing as the case under the reference load condition. The second fuel injection can be omitted, but the addition of the second fuel injection allows a stable combustion to be secured with respect to a large quantity of internal EGR.

Figure 14:
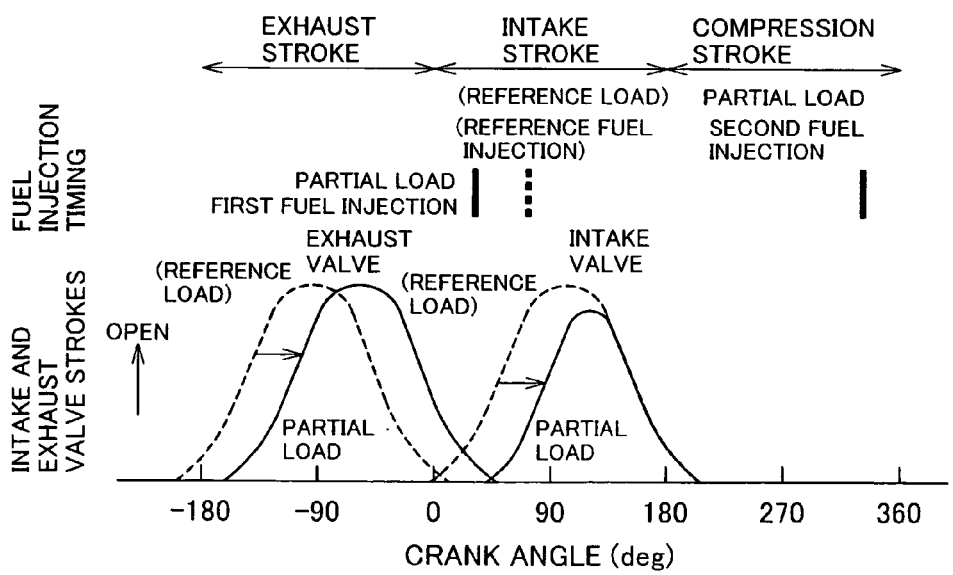
FIG. 14 is a diagram showing valve opening/closing modes and a fuel injection mode according to a ninth embodiment, wherein valve control devices are used by which the opening timing and closing timing of the exhaust valve, and the opening timing and valve lift amount of the intake valve are made variable.

FIG. 14 shows a valve opening/closing mode (opening and closing timings, and lift amount) of each of the intake valve 3 and the exhaust valve 4, and a fuel injection mode (number of injection times and fuel injection timing) provided by the fuel injection valve 5, according to a ninth embodiment, wherein the engine is operating in the reference load range and the partial load range, and wherein, as described in the aforesaid item (C), as the valve control devices 16 and 17, the ones by which the opening timing and the closing time of the exhaust valve 4, and the opening timing and the valve lift amount of the intake valve 3 are made variable, are employed. In this embodiment, the closing timing of the exhaust valve 4 is retarded, and the opening timing of the intake valve 3 is also retarded. However, the closing timing of the intake valve 3 is not retarded, so that the blow down of exhaust gases can be prevented, as well as the blow back of intake air can be inhibited, thereby enhancing the efficiency.

Figure 15:
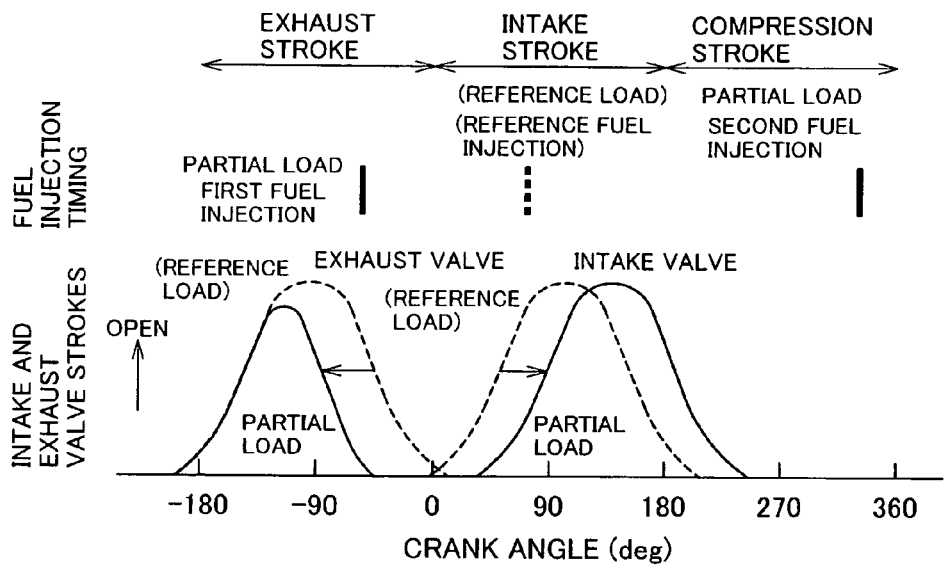
FIG. 15 is a diagram showing valve opening/closing modes and a fuel injection mode according to a tenth embodiment, wherein a valve control device for varying the closing timing and the valve lift amount are used for the exhaust valve, and a valve control device for simultaneously shifting the opening and closing timings is used for the intake valve.

FIG. 15 shows a tenth embodiment wherein, in contrast with the ninth embodiment shown in FIG. 14, as the valve control devices 16 and 17, a valve control device for varying the closing timing and the valve lift amount is used for the exhaust valve 4, and a valve control device for simultaneously shifting the opening and closing timings is used for the intake valve 3. In this embodiment, the closing timing of the exhaust valve 4 is advanced, and the opening timing of the intake valve 3 is also advanced, but the closing timing of the intake valve 3 is retarded. This retardation of the closing timing of the intake valve 3 causes the disadvantage of incurring the blow back of intake air due to the retardation of the closing timing of the intake valve 3, but compression of exhaust gases and fuel in the compression stroke is achievable, thereby producing a high effect at a low cost.

Figure 16:
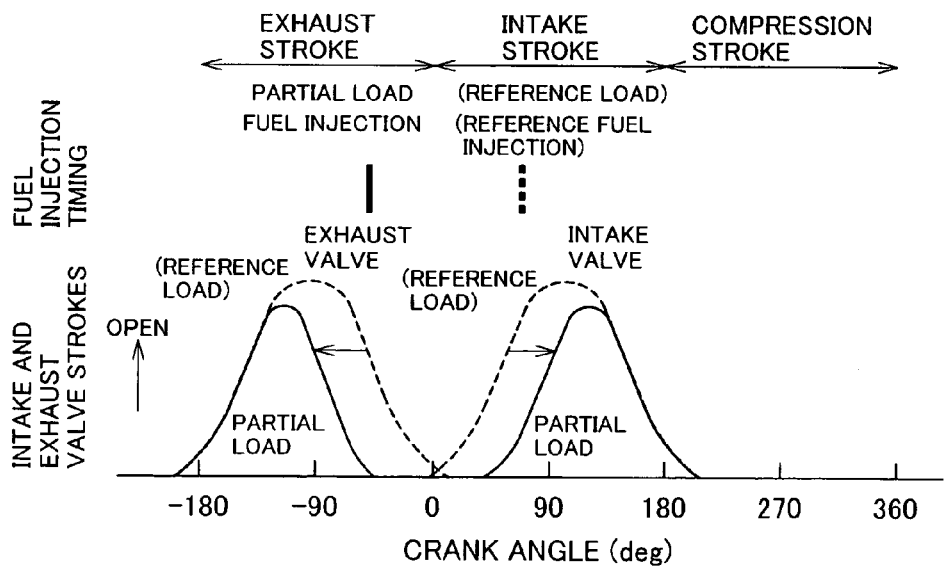
FIG. 16 is a diagram showing an eleventh embodiment in which a fuel injection under the partial load condition is performed only once before the top dead center in the exhaust stroke in the first embodiment shown in FIG. 2.

FIG. 16 shows an eleventh embodiment wherein the fuel injection under the partial load condition in the first embodiment shown in FIG. 2 is performed only once before the top dead center in the exhaust stroke. In this embodiment, the switching between the reference load mode and the partial load mode can be achieved only by switching the fuel injection timing, thus simplifying the control.

Figure 17:
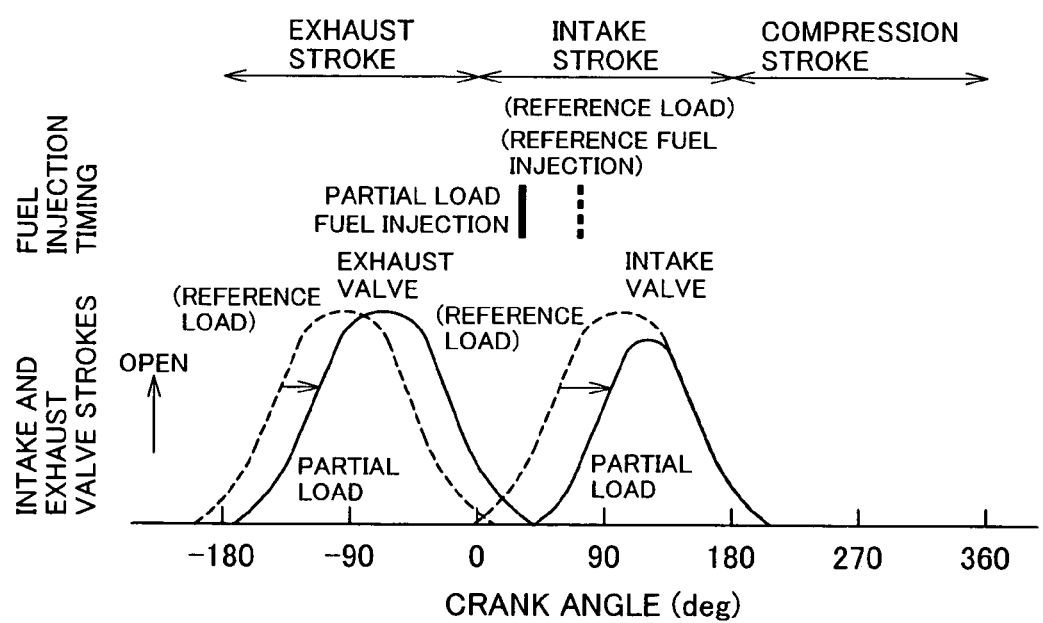
FIG. 17 is a diagram showing a twelfth embodiment in which a fuel injection under the partial load condition is performed only once before the intake valve is opened in the ninth embodiment shown in FIG. 14.

FIG. 17 shows an twelfth embodiment wherein the fuel injection under the partial load condition in the ninth embodiment shown in FIG. 14 is performed only once before the intake valve 3 is opened. In this twelfth embodiment, an effect of simplifying the control can be expected.

As is evident from the foregoing, in the combustion control device and combustion control method for a direct injection engine according to the present invention, under the partial load condition, the exhaust valve is early closed as well as the intake valve is late opened, whereby exhaust gases (burned gases) are caused to remain in the combustion chamber (internal EGR), and fuel is injected from the fuel injection valve into this residual exhaust gases. Therefore, the fuel injected from the fuel injection valve is heated by the heat of exhaust gases and vaporized. Furthermore, in the preferable aspects, the fuel is subject to compression heating by a piston, and thereby the vaporization and radicalization of the fuel is promoted. As a result, even when the engine is cold immediately after startup, the fuel can be sufficiently vaporized and radicalized. This makes it possible to increase the combustion stability, enhance the fuel economy, reduce HC, and improve the starting performance of the engine.

Also, the radicalization of a part of fuel allows the surrounding fuel to self-ignite during combustion, so that the combustion time is reduced, the fuel economy is enhanced (i.e., the degree of constant volume of air-fuel mixture is improved), and the ignition timing can be retarded, resulting in reduced NOx.

Furthermore, performing fuel injection by dividing it into a plurality of times of injections reduces the penetration force of a fuel mist, and decreases the adhesion of fuel to the wall surface of the cylinder. As a consequence, HC is reduced, and the stratification of air-fuel mixture can be achieved, thereby improving the ignitability. Therefore, even though a large quantity of exhaust gases remain (internal EGR), stable combustion can be secured, and simultaneously, the internal EGR makes it possible to decrease NOx and reduce pumping loss, thereby contributing to the improvement in fuel economy.

Moreover, as described above, since not only NOx can be reduced, but also the air-fuel mixture can be combusted under stoichiometric conditions (i.e., substantially in the theoretical air-fuel ratio), a three-way catalyst having high exhaust gas purification performance can be used as an exhaust gas purification system. Consequently, as compared with the case where an NOx catalyst is used, the exhaust gas purification system can be reduced in volume and cost.

What is claimed is:

1. A combustion control device for a direct injection engine, comprising:
   a valve control device capable of varying the valve opening/closing mode of an intake valve and/or an exhaust valve;
   valve opening/closing control means for controlling the valve opening/closing mode by the valve control device;
   a fuel injection valve for injecting fuel into a cylinder; and
   fuel injection control means for controlling the fuel injection mode by the fuel injection valve,
   wherein said valve opening/closing control means controls said valve opening/closing mode of said intake valve and/or said exhaust valve so that exhaust gases remain in a combustion chamber for promoting the vaporization and radicalization of the fuel;
   wherein said fuel injection control means performs control for injecting fuel from said fuel injection valve into the residual exhaust gases at least once during the time period from the latter half of an exhaust stroke to the first half of an intake stroke in one combustion cycle; and
   wherein said valve opening/closing control means and said fuel injection control means perform the respective control operations so that the combustion of an air-fuel mixture becomes stoichiometric combustion.

2. A combustion control device according to claim 1, wherein an ignition of an air-fuel mixture is performed in the latter half of a compression stroke.

3. A combustion control device according to claim 1, wherein said valve opening/closing control means and said fuel injection control means perform the respective control operations when the engine is operating in a partial load range.

4. A combustion control device according to claim 1, further comprising a three-way catalyst as a catalyst for purifying exhaust gases.

5. A combustion control device according to claim 1, wherein, when the operation state of an engine satisfies a specified condition, said fuel injection control means performs a fuel injection by the fuel injection valve during one combustion cycle by dividing the fuel injection into a plurality of times of fuel injections.

6. A combustion control device according to claim 5, wherein said fuel injection control means calculates a fuel injection quantity based on operating conditions of the engine, and wherein, when the calculated fuel injection quantity is no less than two times the minimum controllable quantity of the fuel injection valve, said fuel injection control means performs the fuel injection by dividing it into a plurality of times of fuel injections.

7. A combustion control device according to claim 5, wherein, when performing fuel injection by dividing it into a plurality of times of fuel injections, said fuel injection control means performs a last time of fuel injection in the compression stroke.

8. A combustion control device according to claim 5, wherein, when performing fuel injection by dividing it into a plurality of times of fuel injections, said fuel injection control means sets a fuel injection quantity at each time of the fuel injections to be equal.

9. A combustion control device according to claim 5, wherein, when performing fuel injection by dividing it into a plurality of times of fuel injections, said fuel injection control means fixes a fuel injection quantity at the last time at a constant value, and varies the fuel injection quantities at other times.

10. A combustion control device according to claim 1, wherein said valve opening/closing control means and said fuel injection control means close the exhaust valve before opening the intake valve, in order to cause exhaust gases to remain in the combustion chamber, and wherein said valve opening/closing control means and said fuel injection control means perform at least one time of fuel injection before the intake valve opens.

11. A combustion control device according to claim 1, wherein said valve opening/closing control means closes the exhaust valve before the top dead center in the exhaust stroke.

12. A combustion control device according to claim 11, wherein the valve opening/closing control means opens the intake valve at the crank angle position symmetrical with the crank angle position corresponding to the closing timing of the exhaust valve with respect to the top dead center in the exhaust stroke.

13. A combustion control device according to claim 1, wherein said valve control device can vary an opening timing and a valve lift amount of the intake valve, and/or a closing timing and a valve lift amount of the exhaust valve.

14. A combustion control device according to claim 1, wherein said valve control device simultaneously shifts an opening timing and the closing time of the intake valve and/or the exhaust valve.

15. A combustion control device according to claim 1, wherein said valve control device fixes an opening timing and a closing timing of the exhaust valve, and wherein said valve control device simultaneously shifts an opening timing and a closing time of the intake valve.

16. A combustion control device according to claim 1, wherein said valve control device simultaneously shifts an opening timing and a closing timing of the exhaust valve, and wherein said valve control device fixes an opening timing and a closing timing of the intake valve.

* * * * *